US005103616A

United States Patent [19]

Nordberg

[11] Patent Number: 5,103,616

[45] Date of Patent: Apr. 14, 1992

[54] METHOD AND CONTAINER FOR ENCAPSULATING TIRES

[76] Inventor: Henry T. Nordberg, 510 Lake Rd., Oneida, N.Y. 13421

[21] Appl. No.: 676,945

[22] Filed: Mar. 28, 1991

[51] Int. Cl.[5] .......................... E04C 1/04; E04C 1/10; E04C 1/40; B29C 33/00

[52] U.S. Cl. .......................................... 52/585; 52/606; 52/DIG. 9; 428/903.3; 264/275

[58] Field of Search .................. 52/DIG. 9, 576, 577, 52/606, 585; 428/903.3; 405/16, 33; 264/262, 263, 271.1, 275, 279.1

[56] References Cited

U.S. PATENT DOCUMENTS

| | | | |
|---|---|---|---|
| 422,901 | 3/1890 | Arnett | 52/586 |
| 938,140 | 10/1909 | Goucher | 52/585 |
| 2,257,001 | 9/1941 | Davis | 52/582 |
| 3,390,502 | 7/1968 | Carroll | 52/585 |
| 3,431,687 | 3/1969 | Fischer et al. | 52/223 R |
| 4,057,141 | 11/1977 | Laurie et al. | 428/903.3 |
| 4,997,309 | 11/1991 | Kiselewski | 405/16 |

FOREIGN PATENT DOCUMENTS

| | | | |
|---|---|---|---|
| 2324214 | 11/1974 | Fed. Rep. of Germany | 405/33 |
| 493210 | 10/1919 | France | 52/585 |

*Primary Examiner*—James L. Ridgill, Jr.
*Attorney, Agent, or Firm*—Wall and Roehrig

[57] ABSTRACT

A concrete building block encapsulating a compacted bundle of tires is provided as a permanent environmentally safe container for used automobile tires. The cube of concrete with the tires in it forms an economically attractive light-weight building block that can be used for building fences, walls and other structures and/or disposed of in an efficient environmentally safe fashion to permanently encapsulate the tires and prevent contamination of the environment. A tapered central hole is provided in the block for material handling purposes and interlocking tapered recesses and pucks are provided for aligning multiple layers of blocks when used as a building material. Various sizes and shapes of blocks are disclosed.

17 Claims, 3 Drawing Sheets

METHOD AND CONTAINER FOR ENCAPSULATING TIRES

BACKGROUND OF THE INVENTION

This invention relates to a method and container for disposing of used automobile tires and more particularly to a method of encapsulating a compacted bundle of tires in a concrete block for environmentally safe disposal or reuse.

PRIOR ART

Disposal of used automobile tires is rapidly becoming a major problem for the world. As landfills are becoming filled to overflowing and environmental standards are being tightened, burying of automobile tires is no longer a satisfactory method of disposal Not only is the fire hazard extremely great even when buried, but the space required is totally unavailable in most developed countries. Various solutions to this problem have been suggested, such as cutting and grinding up the tire carcass for reuse in other types of products and processes. Unfortunately, the demand for ground tire materials for use in other processes is not great enough to make any serious dent in the reduction of tire carcasses that must be disposed of. Also, the machinery necessary to chop and grind tires is very expensive. Grinding must be done on a large scale to approach economic feasibility. Tires must be transported to a centralized processing facility and the ground-up product must be shipped to the end user and/or an approved landfill. Various other suggestions have been advanced for using automobile tires for barrier reefs or as bumpers in marine applications and even filled with cement as anchors or coastal protection.

The unsightly appearance of concrete filled tires and the difficulty of banding them together or tying them together for reef applications as well as the problem of holding the reefs in place, has limited the usefulness of tires for this purpose. Also, the volume of applications has been very small compared to the volume of tires to be disposed of. As the environmental standards have become tougher and tougher, fewer and fewer landfills have been approved for disposal of tires and even storage of tires is now regulated by many states and only temporary permits for storage are currently being issued. For instance, in New York State, primarily because no permanent solution to the recycling and/or storage and disposal of automobile tires has been agreed upon, no new permanent storage permits are being issued.

In my co-pending application, Ser. No. 651,956, filed Feb. 7, 1991, I have disclosed a machine for compacting automobile tires into dense bundles in which a row of tires eighteen to twenty feet long can be compacted into a bundle approximately two feet long. This compacted bundle can be handled much more efficiently for shipping and storage than the original loose tires. Compacted tire bundles according to the above invention greatly reduces storage space and landfill space as well as greatly improves efficiency of handling. However, it is still not a permanent solution to the disposition of used tires in that the environmentalists still are not sure of the effect of leeching. of chemicals from the tires when buried in the landfill. There has also been concern expressed that the bands holding the tires in the compacted bundle may eventually break resulting in release of the bundle. Further, the fire risk for large quantities of tires stored above or below ground still exists even with the compacted bundles.

OBJECTS AND SUMMARY OF THE INVENTION

Accordingly, it is an object of the present invention to provide a container and method of encapsulating bundles of automobile tires for permanent, environmentally safe disposal or reuse.

It is another object of the present invention to provide a concrete cube encapsulating a compacted bundle of tires that can be used as a building block for erecting fences, building structures and the like.

It is a further object of the present invention to provide a building block that is lighter and more economical to manufacture than one hundred percent concrete blocks.

It is yet another object of the present invention to completely encapsulate bundles of compacted automobile tires in concrete to form a useful and environmentally safe permanent container for used automobile tires.

It is a still further object of the present invention to provide a low density building block for construction which is economical to make and which provides a stable, enduring, environmentally acceptable block.

It is a still further object of the present invention to provide a method for encapsulating automobile tires that results in an economical, useful end product for construction purposes.

It is yet a further object of the present invention to provide a method for encapsulating used automobile tires in a permanent environmentally safe container that can be economically and easily used without expenditure of large amounts of capital.

It is another object of the present invention to provide a means and apparatus for encapsulating used automobile tires that can be simply and easily operated without special facilities at remote locations.

In one embodiment of the present invention, this is accomplished by forming a cube of concrete about a compacted bundle of tires to completely encapsulate the tires and form a block suitable for use in building fences, walls and other building structures.

BRIEF DESCRIPTION OF THE DRAWINGS

For a better understanding of these and other objects of the present invention, reference is made to the detailed description of the invention which is to be read in conjunction with the following drawings, wherein.

DETAILED DESCRIPTION OF THE PREFERRED EMBODIMENT

Figure 1:
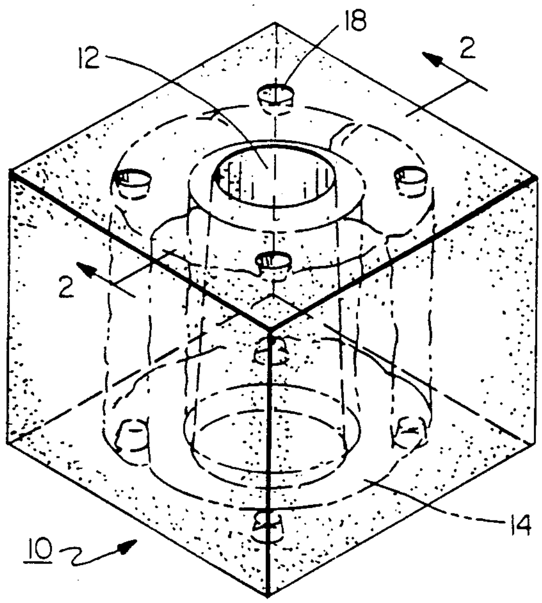
FIG. 1 is a perspective view of a cube of concrete encapsulating a compacted bundle of automobile tires.
Figure 8:
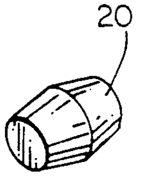
FIG. 8 is a perspective view of a puck connector.

Referring now to FIG. 1 there is shown a cube 10 according to the present invention. Cube 10 has a hollow tapered hole 12 at the center thereof and from the exterior appears to be a solid block of concrete with a tapered central hole therein. The block shown in FIG. 1 is a cube with equal length, width and height dimensions. Positioned within the cube is a compacted bundle of tires 14. The bundle of tires 14 is positioned within the mold for the cube before it is filled with concrete so as to be concentric with and spaced from the core used to form the hole 12. The bundle of tires 14 is formed on the machine disclosed in my above-identified patent application and is held in the compacted condition by four fish eye cables 16 for easy handling. The bundle 14 is positioned within the mold 22 for the cube 10 so as to be spaced from the sides, top and bottom, and the central core thereof so that when the mold is filled with concrete, the tire bundle 14 is completely encapsulated with concrete covering all surfaces. As indicated above, from an external inspection of the finished cube 10 there is no evidence of a bundle of tires therein. The tire bundle 14 is completely enclosed within concrete including the outer surface, the inner surface and the top and bottom. The bundle of tires is thus completely isolated from the environment and is securely held in a long lasting encapsulating material that is environmentally inert.

The hole 12 is provided as an easy means for picking up and handling the concrete block 10 for use or disposal. A split cone lifting apparatus, as is well known in the art can be used with the usual material handling lift trucks and the like to lift the cube. The cube 10 is about three feet on a side and generally would weigh, if solid concrete, in the neighborhood of four thousand pounds, typical concrete mixtures being approximately four thousand pounds per cubic yard. The finished cube 10 with the bundle of tires therein will weigh approximately twenty-two hundred pounds with the tires being something on the order of four hundred pounds and the balance being concrete used to fill the cube around the tires. The cube 10 thus is a low density or light-weight building block which can be used for a wide variety of purposes, as will be described herein. Also, since only approximately eighteen hundred pounds of concrete is needed to form the cubic yard block, the cost of the block is significantly less than the cost of a one hundred percent cement block of the same size.

Figure 2:
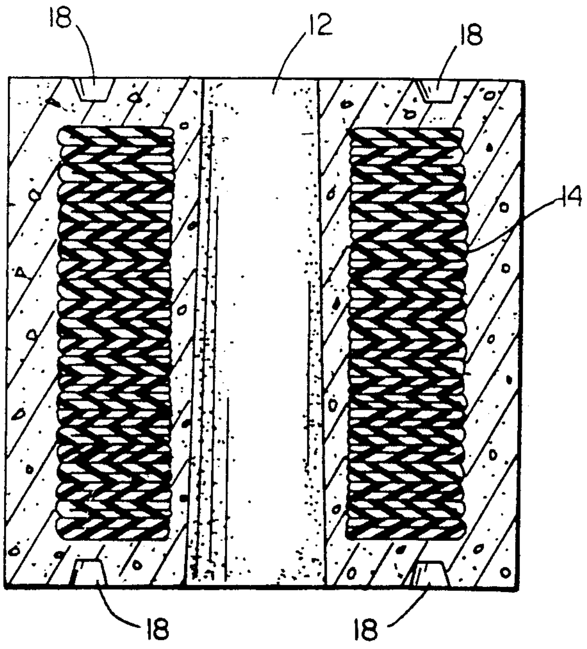
FIG. 2 is a cross sectional view on line 2—2 of FIG. 1.
Figure 3:
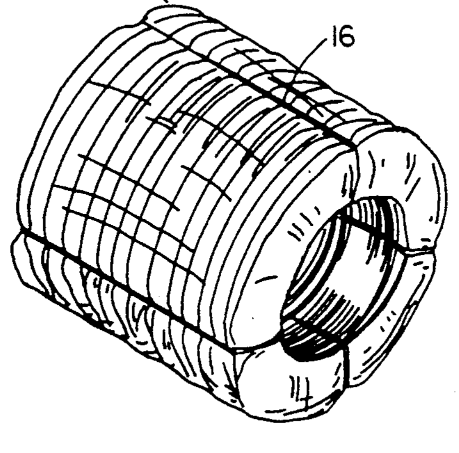
FIG. 3 is a perspective view of a compacted bundle of tires.

As may be seen in FIGS. 1 and 2, there is formed in the block during the molding process four tapered recesses 18, both in the top and bottom of the block. These "puck type" recesses are positioned to align with each other when one block is placed on top of another or to permit displacement of the upper block by one half a block. By inserting a truncated cone "hockey puck" 20, in the recesses 18, a block placed on top of the lower block is interlocked and aligned therewith to form a unitary structure. As will be described in more detail in connection with FIG. 7 these recesses permit displacement of the second tier of blocks by one-half the side of a cube to provide with the "hockey pucks" 20 an interlocking relationship when a wall or fence is formed from multiple tiers of these cubes piled one on top of the other.

Figure 4:
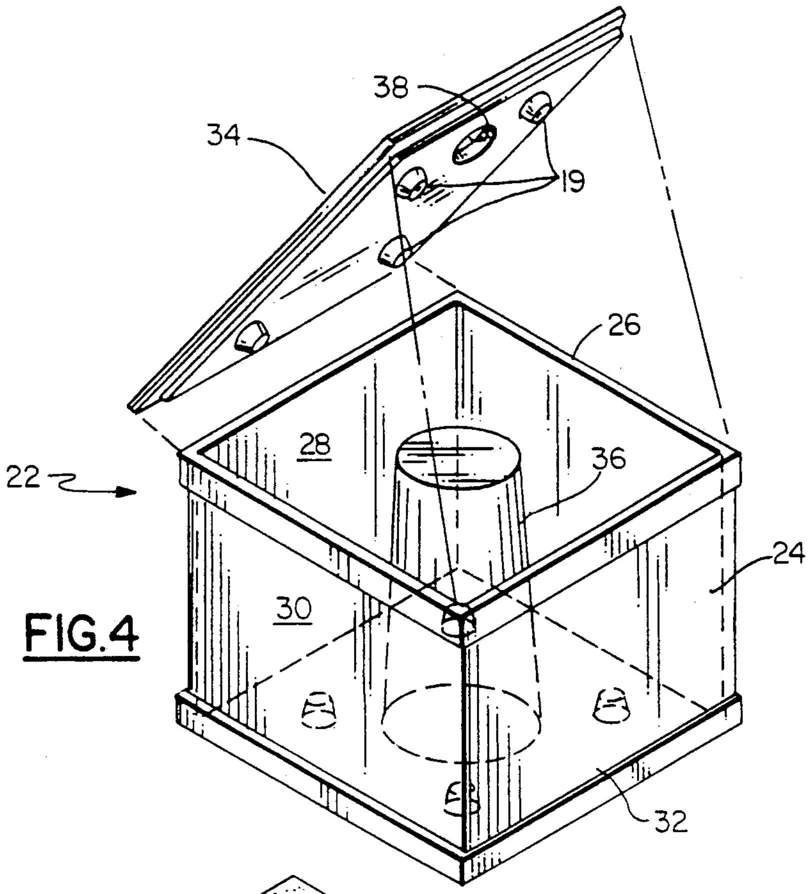
FIG. 4 is a perspective view of a mold for the cube of FIG. 1 with the top open and a tapered core installed.

Referring now to FIG. 4, there is shown a mold for forming the cube of FIG. 1. The mold 22 consists basically of sheets of metal or other material sufficiently strong to form sides, top and bottom for the cube. In one preferred form, they are cast iron plates 24–34 interlocked together by tabs and slots not shown, to form an open box. With the top removed, a tapered core 36 is placed in the box. A bundle of tires 14 is positioned about the core so there is space between the core, the bundle and the sides and the top and bottom of the mold. The mold is then filled with concrete. This may be done by pouring concrete into the open container and then working the top plate 34 down to form a tight enclosure and in so doing to finish off the top surface by floating the cement to the top of the surface as is customary in finishing concrete. The box may be closed by top plate 34 and concrete poured in through an opening 38 to fill the mold to form the cube and to completely encapsulate the bundle of tires. Alternatively, a concrete slurry may be pumped into the mold through the opening 38 until the mold is full. Again, to facilitate the filling and molding operation, the entire mold assembly can be vibrated or shaken during the filling operation, as is well known in the industry.

The filled mold is then put aside to allow the concrete to cure and when the concrete is solidified, the mold is disassembled and the core 36 is removed from the block leaving the finished block as shown in FIG. 1. If it is desired to accelerate the curing of the cube of concrete, steam heating or other accelerating mechanisms can be used as is well known in the concrete art.

When it is desired to form the recesses 18, small truncated cones 19 are bolted to the inside surface of the top and bottom plates of the mold in the appropriate locations to form the recesses when the mold is filled. Additionally, set screws (not shown) may be placed in holes in the sides at the appropriate locations to permit formation of corresponding recesses 18 in the sides. When it is desired to have a smooth side, no recesses are formed. If recesses 18 are to be placed on the side surfaces of the block, similar truncated cones can be bolted on the side surfaces after removing the set screws. The patterns can be varied to meet the particular requirements of the end use of the product.

While I have shown the cube as a simple flat surface on all surfaces, it is apparent that the various faces of the mold surface could be textured or otherwise formed to impart an architectural finish to certain surfaces of the cube when the cube is going to be used in a particular building or other decorative application. These techniques are well known in the cast concrete wall business, and can be adapted to the present products by those skilled in the art.

Figure 5:
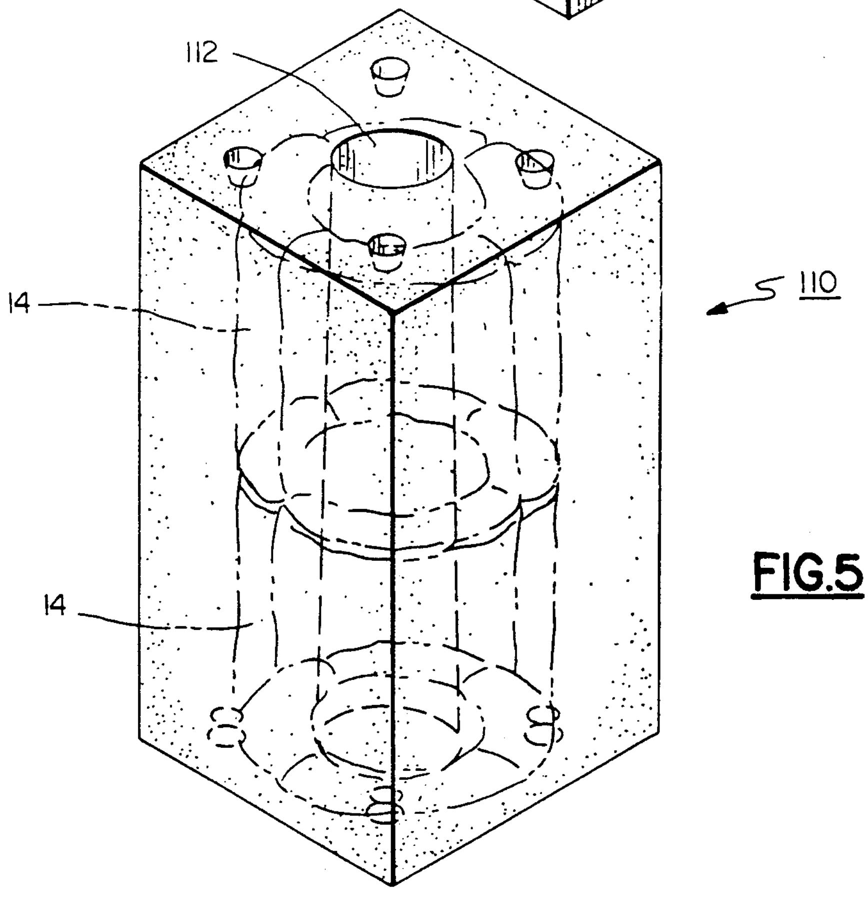
FIG. 5 is a view similar to FIG. 1 of another embodiment of the present invention.

Referring now to FIG. 5, there is shown another embodiment of the present invention in which a mold is formed essentially twice as high as the mold shown in FIG. 4 which results in a rectangular block 110 approximately three feet on a side and approximately six feet tall. For certain applications this configuration has been found to be a more advantageous arrangement and it encapsulates two full bundles of compacted tires about a central hole 112'. Again, with a collapsing disk lifting apparatus the two high block can be quickly and easily handled for further use and/or disposal.

Figure 6:
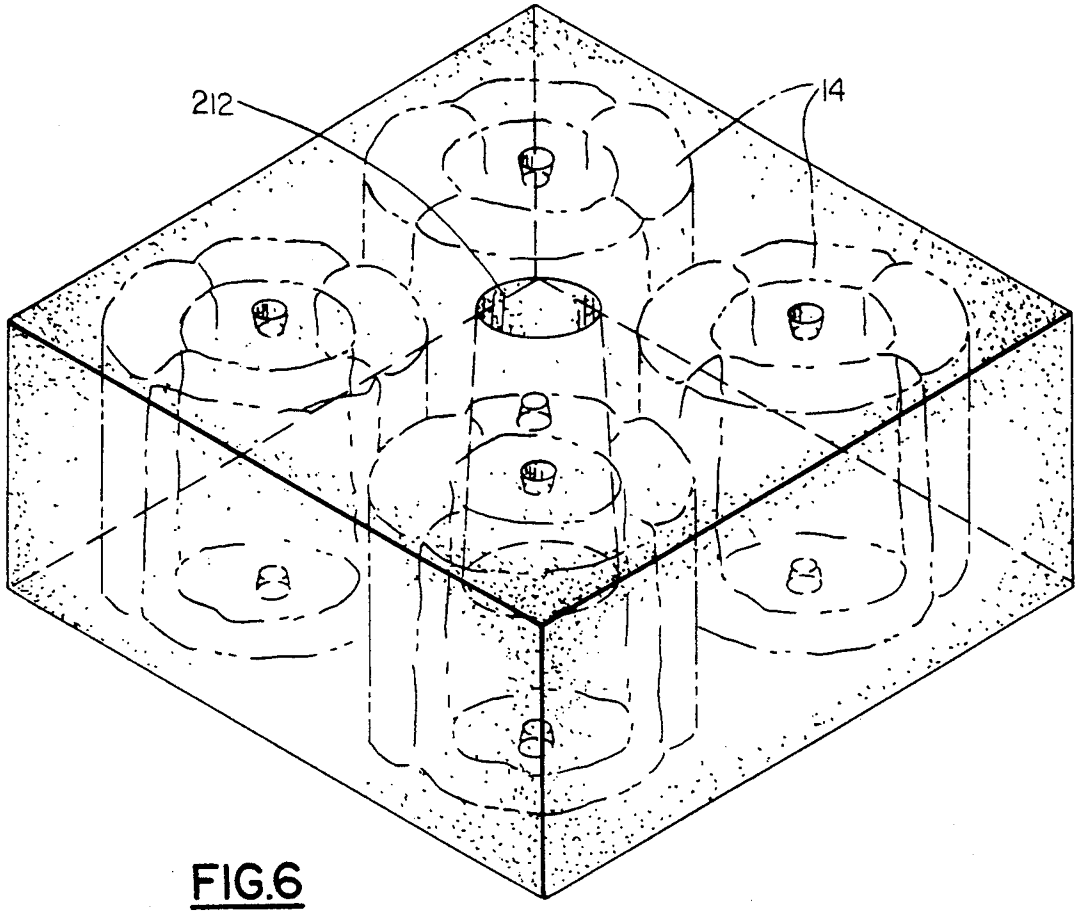
FIG. 6 is a perspective view of a still further embodiment of the present invention.

Referring now to FIG. 6, there is shown a still further embodiment of the present invention in which four compacted bundles of tires are disposed about a central core 212 to form a block roughly six feet on a side and three feet high. Again, a central tapered hole 212" is formed at the center to permit split cone lifting apparatus, customary in the art, to lift the heavy blocks of concrete. This larger heavier block of concrete encapsulating four bundles of tires is perhaps more advantageous when the application of this sort of product is for use as "rip-rap" on shorelines to protect against wave action. Sometimes a single cube, even though weighing twenty-two hundred pounds is not heavy enough to provide the necessary protection and the larger block can be advantageous.

Figure 7:
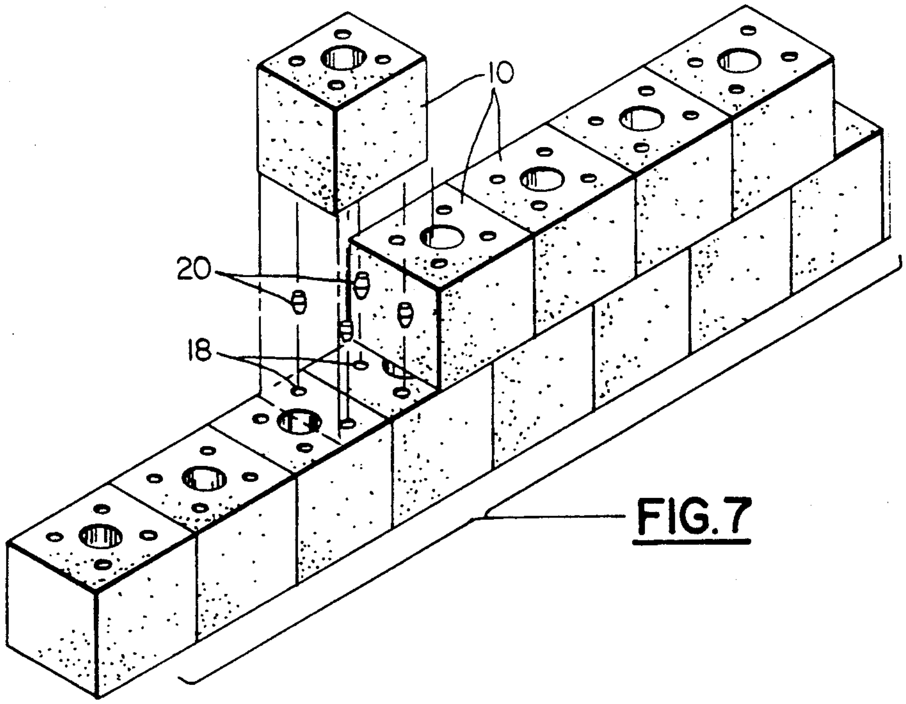
FIG. 7 is a perspective view of a wall constructed with the cubes of FIG. 1.

Referring now to FIG. 7, there is shown a series of cubes of the configuration of FIG. 1 laid up in a wall type of configuration to form a fence or wall for a structure. As can be seen, a series of blocks 10 are placed side by side on a first tier and then a second row of blocks 10 are placed on top of the first row, but displaced laterally one-half the width of the cube. Addition of "pucks" 20 in the recesses 18 forms an interlocking structure preventing misalignment of adjacent blocks on either the first or second layers. Further layers could be added as is well known in the construction of block walls and other structures.

I have thus shown a method and container for encapsulating compacted bundles of tires that forms a permanent environmentally acceptable enclosure for used automobile tires and yet provides a useful and functional building block for use in building fences, walls, buildings, and the like. The block not only encapsulates the tires, but it provides a very useful, easily used material for forming useful structures. The encapsulated blocks are not only economical to manufacture, but have an economic value of their own in addition to their environmental value.

It also should be realized that the blocks of FIG. 1, if they are not to be used in building a structure for useful purpose, can be disposed of simply and easily by burying or by filling in low spots and so forth. Alternatively, they can be used as foundations for roadways, foundations and other applications since they are permanent structurally sound fire-proof containers of tires which will not be damaged in a wide variety of applications. I have thus provided a method and structure for encapsulating tires that permits the economical disposition of automobile tires without the drawbacks of the prior art and with many economic and practical advantages for unlimited applications to useful purposes thus greatly facilitating the disposal of automobile tires to help solve the disposal and/or recycling problem confronting society today.

While this invention has been explained with reference to the structure disclosed herein, it is not confined to the details set forth and this application is intended to cover any modifications and changes as may come within the scope of the following claims:

What is claimed is:

1. A modular enclosure for encapsulating compacted bundles of automobile tires comprising in combination:
   at least one compacted bundle of automobile tires having a plurality of tires compressed together and held in a doughnut shape;
   a quantity of concrete molded about said bundle of tires completely surrounding the circumference and top and bottom of said bundle of tires;
   lifting means formed in said molded quantity of concrete; and
   the exterior of said molded quantity of concrete being formed to present a decorative exterior appearance completely encapsulating said bundle.

2. A modular enclosure according to claim 1 wherein said quantity of concrete is molded in the form of a cube; and
   said concrete cube has a tapered hollow core in axial alignment with the core of the bundle of tires forming an interior truncated cone lifting means.

3. A modular enclosure according to claim 1 further including two bundles of compacted and banded tires positioned coaxially one on top of the other.

4. A modular enclosure according to claim 1 further including:
   four bundles of compacted and banded tires encapsulated in the molded quantity of concrete;
   said tapered hollow core is formed in the center of the block; and
   said bundles are symmetrically disposed about said hollow tapered core so as to form a large rectangular concrete block.

5. A modular enclosure according to claim 1 wherein said quantity of concrete comprises a rectangular block of concrete having a length and width greater than the diameter of the compacted tires and a height greater than the compacted height of the tire bundle.

6. A modular enclosure according to claim 5 further including a plurality of tapered recesses formed in at least two opposing faces of the rectangular block.

7. A modular enclosure according to claim 6 wherein said plurality of recesses comprises four shallow truncated cone recesses symmetrically placed about the top and bottom surfaces of said block.

8. A low density high volume concrete block wall comprising:
   a plurality of concrete cubes positioned side-by-side in at least a two course high configuration;
   each concrete cube having a hollow core at the center thereof;
   a plurality of automobile tires compressed and banded into a compact bundle disposed about said core and encapsulated in said concrete cube;
   the second course of blocks being displaced horizontally relative to the first course by a distance equal to one-half the dimension of the cube so as to form a wall having a density approximately one-half that of a wall of solid concrete cubes of the same dimension.

9. A block wall according to claim 8 further including four recesses in the top and bottom of each cube symmetrically arranged about the core so that the recesses in the bottom of the blocks of the top course of blocks will be in line with two recesses in the tops of each of two adjacent cubes in the first course;
   an alignment "puck" positioned in each recess in one course of cubes extending into a corresponding recess in the other course of cubes;
   so as to form a structurally interlocked wall of concrete blocks resistant to lateral displacement relative to each other.

10. A block wall according to claim 8 wherein said concrete cubes are disposed with said hollow cores in a vertical position.

11. A block wall according to claim 8 wherein said concrete cubes are disposed with said hollow cores in a horizontal position.

12. A method of encapsulating compacted bundles of automobile tires in concrete to form useful, environmentally safe, tire disposal containers which comprises:
   forming a generally hollow mold to receive a quantity of concrete having a top and bottom;

positioning means for forming a lifting mechanism in the molded concrete for lifting the completed container when the mold is removed therefrom;

positioning at least one bundle of compacted and banded tires in said mold;

filling said mold with concrete to surround and encapsulate said bundle of tires;

allowing the concrete to solidify and set;

removing the means for forming the lifting mechanism after the concrete has set; and removing the block of concrete formed about the bundle of tires in the mold from said mold to form a multi-use environmentally acceptable tire container suitable for permanent disposition or use.

13. The method according to claim 12 further including forming a generally rectangular hollow mold by joining a plurality of sheet members to form top, bottom and sides thereof;

forming a tapered cylindrical core member positioned in said mold to extend from the bottom to the top of said mold to form said lifting means;

positioning said core member at the center of said mold;

positioning a single bundle of tires in said mold concentrically about the core member.

14. The method according to claim 13 further including:

forming a plurality of alignment means in at least two surfaces of said mold so as to allow one container to be mounted on a second container in a predetermined relationship.

15. The method according to claim 13 wherein said filling step comprises pumping a concrete slurry into said mold so as to fill the mold all around the tire bundle and completely encapsulate the tire bundle in concrete.

16. The method according to claim 13 further including positioning four bundles of tires in said mold symmetrically about the circumference of said core member.

17. The method according to claim 16 wherein said filling step comprises pumping a concrete slurry into said mold so as to fill the holes in the four tire bundles and all around the four tire bundles positioned in the mold to completely encapsulate the tire bundles in a block of cement.

* * * * *